(12) United States Patent
Radcliff

(10) Patent No.: US 6,964,442 B1
(45) Date of Patent: Nov. 15, 2005

(54) LOG ROCKER

(76) Inventor: John B. Radcliff, 222 Main St., Alton, IL (US) 62002-1742

(*) Notice: Subject to any disclaimer, the term of this patent is extended or adjusted under 35 U.S.C. 154(b) by 0 days.

(21) Appl. No.: 10/916,123

(22) Filed: Aug. 12, 2004

(51) Int. Cl.⁷ .............................................. B65G 7/08
(52) U.S. Cl. ........................ 294/17; 294/104; 254/131
(58) Field of Search ................ 294/15, 16, 17, 294/60, 104; 254/131, 132; 414/453

(56) References Cited

U.S. PATENT DOCUMENTS

| | | | | |
|---|---|---|---|---|
| 2,804 A | * | 10/1842 | Humes | ........................ 83/427 |
| 673,700 A | * | 5/1901 | Cherrington | ................ 414/453 |
| 2,600,577 A | * | 6/1952 | Roe | ........................... 254/131 |
| 2,693,935 A | * | 11/1954 | Halbert | ........................ 254/131 |
| 2,718,375 A | * | 9/1955 | Purdy | ........................... 254/131 |
| 2,733,895 A | | 2/1956 | Trenkle | |
| 2,872,888 A | * | 2/1959 | Kearney | ...................... 269/55 |
| 4,221,416 A | | 9/1980 | Piontkowski | |
| 4,240,657 A | | 12/1980 | Feighery | |
| 4,368,874 A | | 1/1983 | Weisgerber | |
| 4,433,829 A | * | 2/1984 | Grover et al. | .............. 254/131 |
| 4,637,769 A | * | 1/1987 | Thorndike | .................. 414/454 |

* cited by examiner

*Primary Examiner*—Dean J. Kramer
(74) *Attorney, Agent, or Firm*—Don W. Weber

(57) ABSTRACT

A log rocker has a long lever arm with a back cylinder fulcrum at its bottom end. Also attached to the bottom end of the lever arm is a semi-circular, curved, pair of prongs and an upper, semi-circular shaped, pivoting surround arm. The surround arm has a spike at its outer end. The lever arm also has a handle at the top and a foot brace about one-third from the ground. To use the device the logger forces the pair of prongs underneath a log and then locks the log onto the rocker by rotating the upper, surround, pivot arm and driving the spike into the log to secure the device around the log. The lever can then be rotated to allow the logger to raise the log up off the ground and onto the cylindrical fulcrum for cutting.

1 Claim, 3 Drawing Sheets

LOG ROCKER

BACKGROUND OF THE INVENTION

This invention relates to the field of logging and converting logs into firewood with a chainsaw. More particularly, a device is presented which lifts a log from the ground so that a chainsaw may cut the log into smaller cylindrical pieces.

In the logging and tree-cutting field, chainsaws have been utilized in order to cut down trees. Once the trees are horizontally on the ground, the limbs are normally trimmed with a chainsaw. The tree is then cut into approximately two to three foot cylindrical sections for splitting. Since the circular tree is normally lying partially in the ground after falling, the last part of the longitudinal cut of the log requires that the chainsaw come into contact with the dirt, rocks, or other debris in the ground. A chainsaw is quickly dulled and put out of use when it is utilized to cut dirt or rock. In order to prolong the life of the chainsaw and the efficiency of the workmen, it would is desirable to lift the log up off the ground to enable a logger to cut it completely through cleanly. It is an object of this invention to provide a log rocker or jack to lift a fallen tree or log from the ground for cutting.

A number of devices have been designed to help a logger avoid cutting the ground debris with his chainsaw. Among the more useful devices is the 1980 United State's patent issued to Feighery, U.S. Pat. No. 4,240,657. The Feighery device includes a handle and two jaws which slide vertically to adjust around the log. The handle is then utilized as a lever and pulled down. The Feighery device lifts the log approximately one inch off of the ground. While Feighery is an improvement in the log-cutting field, it does not provide enough height, leverage, clearance, or adjustability to be suitable for many common logging operations. It is an object of this invention to provide a highly adjustable log rocker that enables workmen to lift fallen logs up off the ground approximately six to twelve inches. Another object of this invention is to provide a device that is capable of adjusting to accommodate the various sizes of logs, up to four to six feet in diameter.

Another device of interest in this field is found in the 1983 Patent issued to Weisgerber, U.S. Pat. No. 4,368,874. Weisgerber disclosed a device having a bottom rocking mechanism as well as an upper pivotal hook. The shoe of Weisgerber, coupled with the upper rotatable hook, make raising a log of certain limited dimensions easier and more efficient. However, one drawback of the Weisgerber device is that it does not allow a workman to position the log rocker device entirely under the log. Also, many commonly felled logs would be too large in diameter to be lifted by the Weisgerber device. It is an object of this invention to provide a log rocker device that enables a workman to elevate a log up from the ground after placing the log rocker device entirely underneath the log.

Many times when trees fall, the log itself embeds into the ground, particularly when the ground is soft. Many devices such as that found in Weisgerber and Feighery are not capable of lifting a log that has been sunken into the ground. It is a still further object of this device to provide a log rocker that lifts heavy logs, which are sunken into the ground due to their fall, from the ground to enable a workman to cut longitudinal sections.

Other and further objects of this device will become obvious upon the below described specification.

BRIEF DESCRIPTION OF THE DEVICE

A log rocker device is presented having an elongated handle approximately six feet long. Attached at the lower back end of the handle is a cylindrical fulcrum strong enough to enable the workman to rotate a large, heavy log from the ground. Also attached to the bottom part of the elongated handle is a pair of pointed, semi-circular prongs. The lower prongs are able to slide underneath a log even when it is sunken into the ground. At the upper end of the circular prongs is a pivotable upper surround member. This pivotable surround member is also semi-circular and is designed to pivot over and around the log to be raised. A spike at the end of the semi-circular surround member is driven into the log. The entire device thus surrounds the log for lifting. By pulling down on the upper handle attached to the elongated lever arm, the device pivots on the lower cylindrical fulcrum and allows the log to be lifted approximately six to twelve inches off of the ground. Because of the semi-circular nature of the surrounding arms and the large cylindrical fulcrum, lifting a log up off the ground is made much easier and efficient.

DETAILED DESCRIPTION OF THE DEVICE

A strong yet lightweight log rocker enables a workman to lift a log from the ground. The log rocker comprises an elongated lever arm 1 which may have a square cross section as shown. However, the lever arm may also have a circular cross section while still keeping within the spirit and disclosure of this invention. a main feature of the elongated lever arm 1 is that it be made of a strong metal such as steel. Attached to the top of the elongated lever arm 1 is a perpendicular handle 2, as best shown in FIG. 3.

Figure 1:
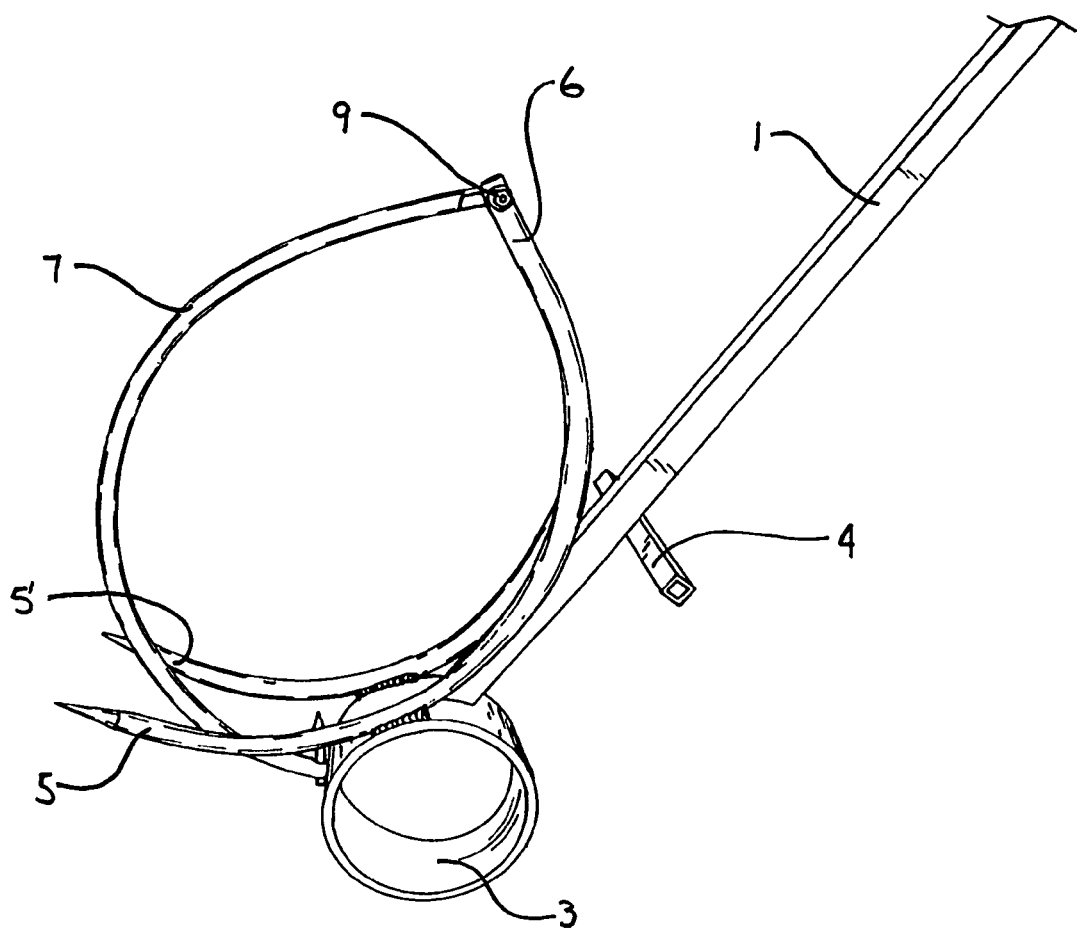
FIG. 1 is perspective view of the device.

At the bottom and back of the lever arm 1 is a lower, back fulcrum cylinder 3. This fulcrum cylinder 3 is preferably made of strong tubular steel as best shown in drawing FIG. 1. The fulcrum 3 must be strong enough to carry the weight of a large log, such as shown at 10. Also attached to the lever arm 1 is a lower, intermediate perpendicular foot brace 4. This foot brace allows the logger to use the upper handle 2 with his hands and the foot brace 4 with one foot in order to lift the log 10 from the ground.

One key feature of this device is a pair of lower stationary prongs. These left 5 and right 5' prongs are semi-circular in shape. The left and right prongs are attached at the bottom end of the lever as shown and meet at a common point 9 as best shown in drawing FIG. 1. The upper parts of the prongs form a stationary semi-circular support member 6.

Figure 3:
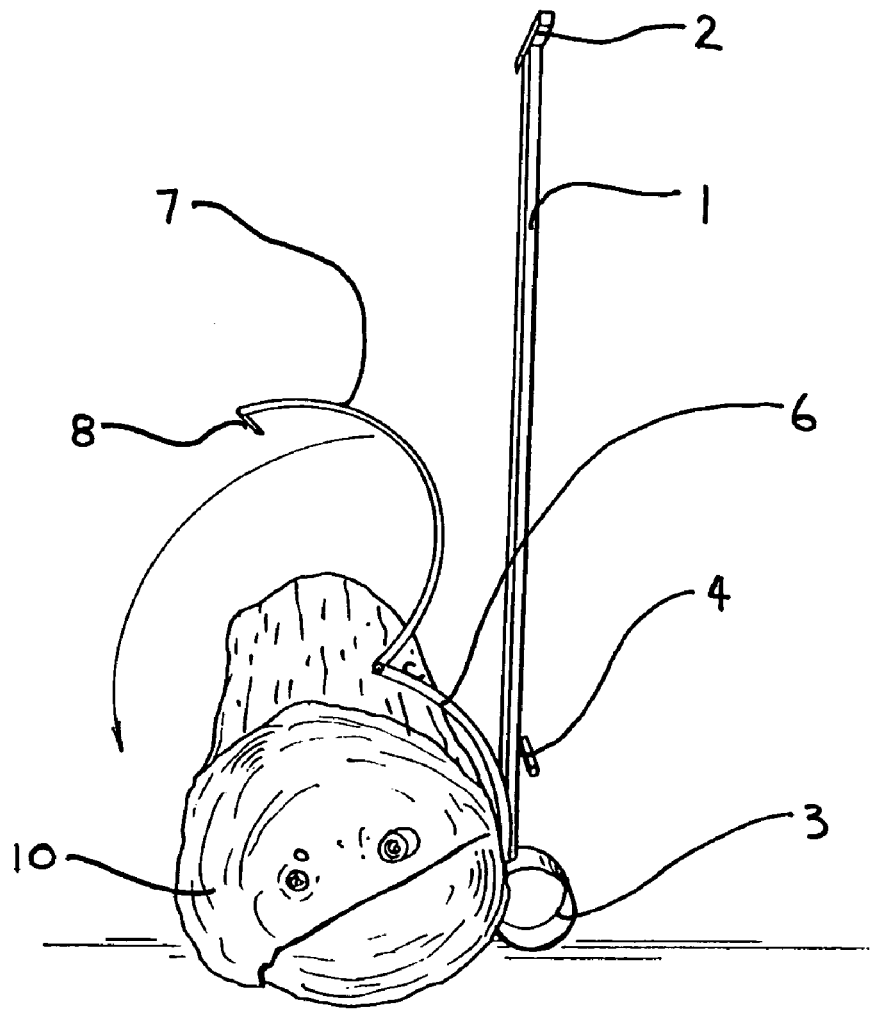
FIG. 3 is a perspective view of the device showing it placed underneath the log with the upper surround member about to be closed around the upper part of the log.

The lower stationary prongs 5 and 5' join and form a singular upper stationary support member 6, as best shown in FIG. 3. Attached at the upper end of the upper stationary member 6 is an upper pivotable surround member 7. This surround member 7 has a point or spike 8 at its far end. The upper pivotable surround member is pivotably connected to the stationary support member 6 at pivot point 9.

Figure 2:
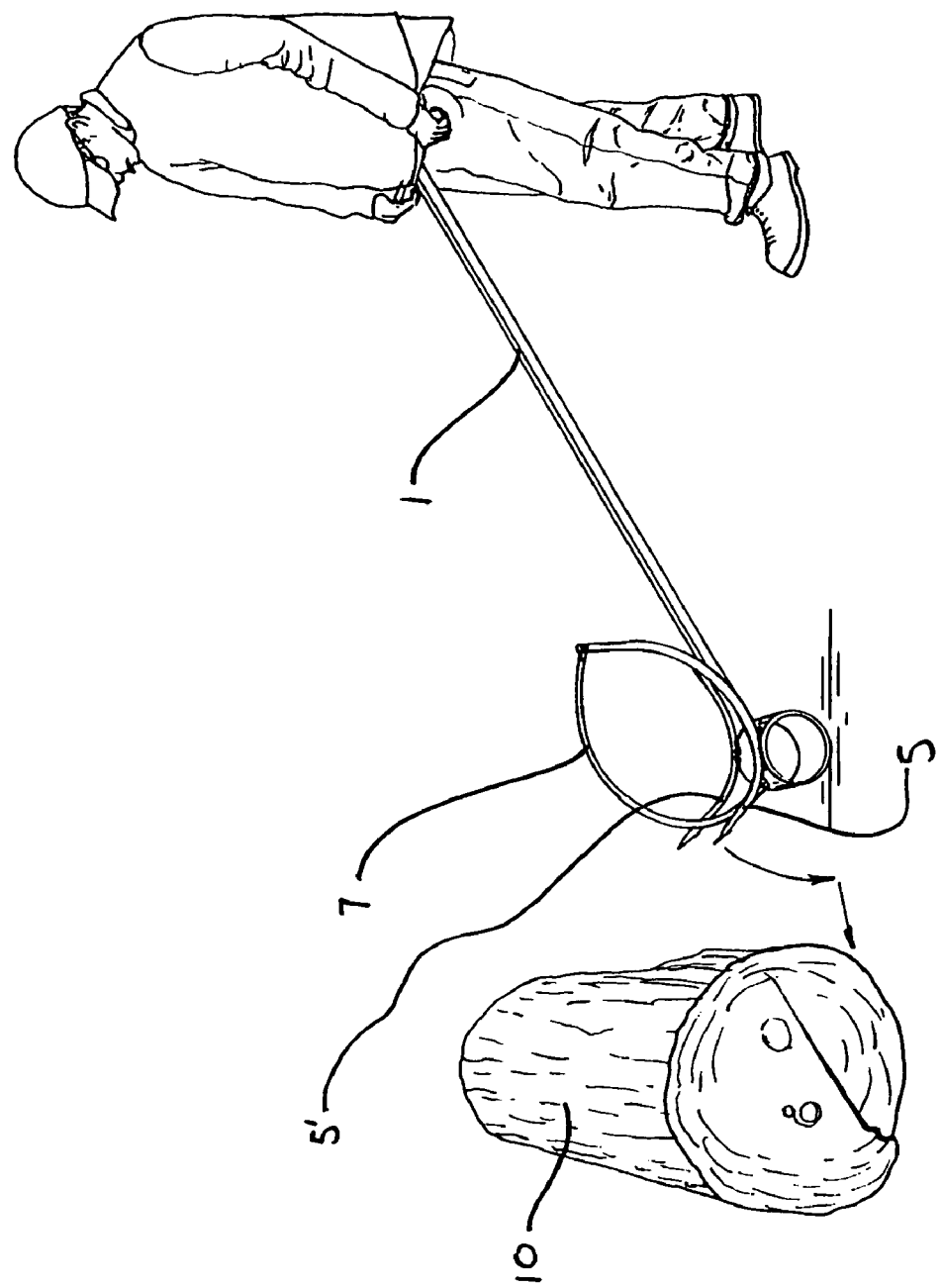
FIG. 2 is perspective of the device shown in its environment of use..

Turning now to FIGS. 2 and 3, the use of the device is shown. The upper pivotable surround member 7 is normally carried on the device in the down and unattached position as shown in FIG. 2. In order to utilize the device, the upper pivotable surround member 7 is raised as shown in FIG. 3 while the lower prongs 5 and 5' are pushed underneath the log 10. Because the outer ends of the lower stationary prongs 5 and 5' are pointed, and because they are curved, the lower prongs 5 and 5' are readily placed underneath he curvature of the log 10.

Once the prongs 5 and 5' have been pushed underneath the curvature of the log 10, the upper pivotable surround member 7 is rotated in a counter-clockwise direction as shown by the arrow in FIG. 3. Once the surround member 7 is rotated in the counter-clockwise position and surrounds the log 10, the spike 8 located at the outer end of surround member 7 may then be driven or pounded into the log 10, either by using the workmen's boot or hammer or similar hard object.

When the log 10 is completely surrounded by the lower stationary prongs 5 and 5', the upper stationary support member 6 and the upper pivotable surround member 7, the handle 2 may be pulled in a clockwise direction. This clockwise motion of the lever 1 forces the log 10 to pivot about the lower fulcrum cylinder 3. When the upper handle 2 is on the ground the log 10 will be lifted up off the ground at a height equal to the diameter of the lower fulcrum cylinder 3, which is generally 10 to 12 inches. The log may then be conveniently cut into longitudinal sections for splitting or other uses without the chainsaw touching the ground or other debris.

The device is simple to use and construct, yet is durable and highly functional. The length of the elongated lever arm 1 may be anywhere from four to eight feet, depending on the uses of the device. The placement of the upper handle 2 and the lower foot brace 4 could be modified as suited to the individual logger. The semi-circular nature of the lower prongs and upper stationary support member, along with the semi-circular shape of the upper pivotable surround member allow the entire device to surround the log and to make it much more desirable as a log lifting device.

Other attempts to solve this problem have not allowed a strong yet highly portable device capable of lifting logs in excess of three feet. This particular device could be used for very large logs simply by making the lever arm 1 longer, the fulcrum cylinder 3 larger, and the prongs and surround members bigger in diameter. However, it is the combination structure of the lower prongs, upper stationary member and the pivotable and attachable pivotable surround member that enable this device to completely surround the log to be lifted that makes this device new, novel and unique.

The invention described herein may have minor variations while still keeping within the spirit and disclosure of the device. For example, either tubular steel or angle iron may be used to fashion the device. Further, the dimensions of the device may vary while still keeping within the spirit and disclosure herein.

Having fully described my device, I claim:

1. A log lifting and rocking device for lifting a fallen log from the ground to facilitate cutting the log, comprising:
    (a) an elongated arm made of strong metal, having a perpendicular upper handle and a perpendicular lower intermediate foot brace;
    (b) at least two lower identical, stationary arcuate prongs, said prongs diverging from a common point, further comprising an upper arcuate part, attached at said common point, wherein said upper part forms a stationary upper arcuate support member, wherein the outer ends of said identical lower prongs are pointed and wherein said fallen tree may roll on said divergent prongs and upper part;
    (c) an upper, pivotable, semi-circular surround member pivotably attached to the upper part of said upper stationary support member, wherein the upper surround member has a spike at its far end adapted to be driven into said log;
    (d) a cylindrical fulcrum permanently attached to the bottom end of said elongate arm and permanently attached to each of said identical divergent lower prongs;
    wherein said lower pointed prongs may be pushed underneath a fallen log and wherein said upper, pivotable surround member may be pivoted around the upper part of said log, and wherein said spike may be driven into said log, whereby said log may be completely surrounded by said log device and lifted.

* * * * *